Dec. 19, 1933. C. LINDENBERG 1,940,427
VERTICAL MULTICYLINDER FOUR-STROKE CYCLE INTERNAL COMBUSTION ENGINE
Filed March 14, 1929 10 Sheets-Sheet 1

INVENTOR:
CARL LINDERBERG.
BY Emery, Booth, Varney & Townsend
ATTYS.

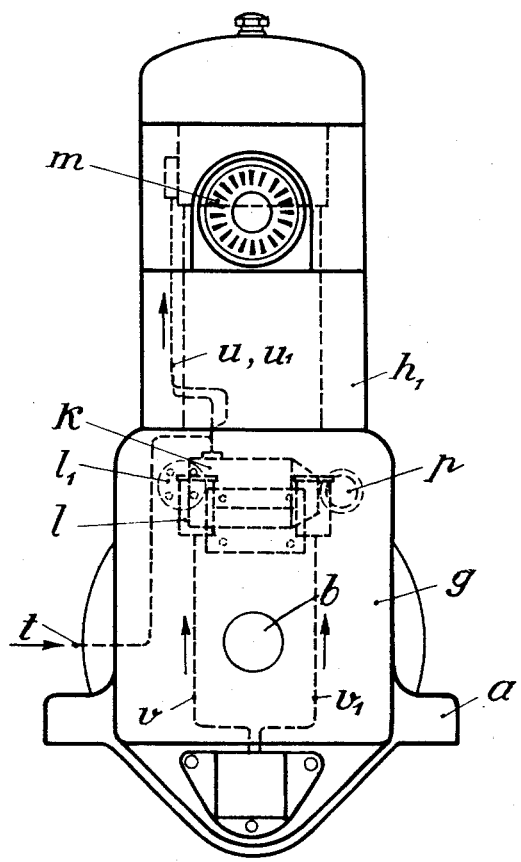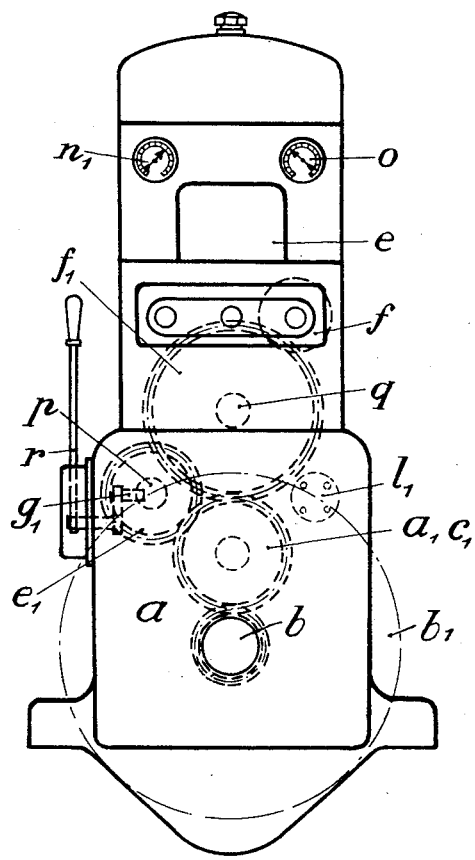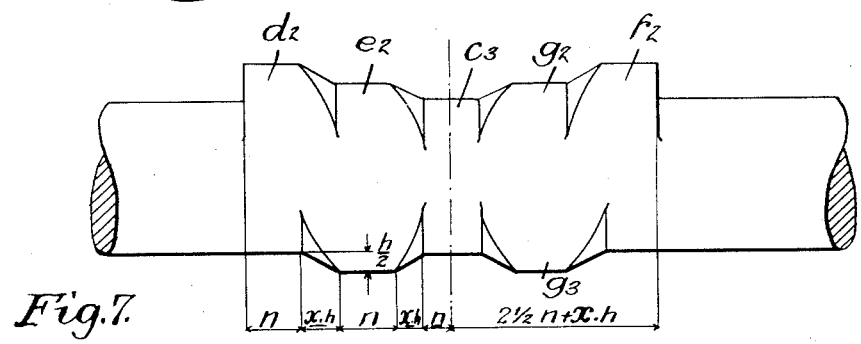

Dec. 19, 1933.  C. LINDENBERG  1,940,427
VERTICAL MULTICYLINDER FOUR-STROKE CYCLE INTERNAL COMBUSTION ENGINE
Filed March 14, 1929  10 Sheets-Sheet 5
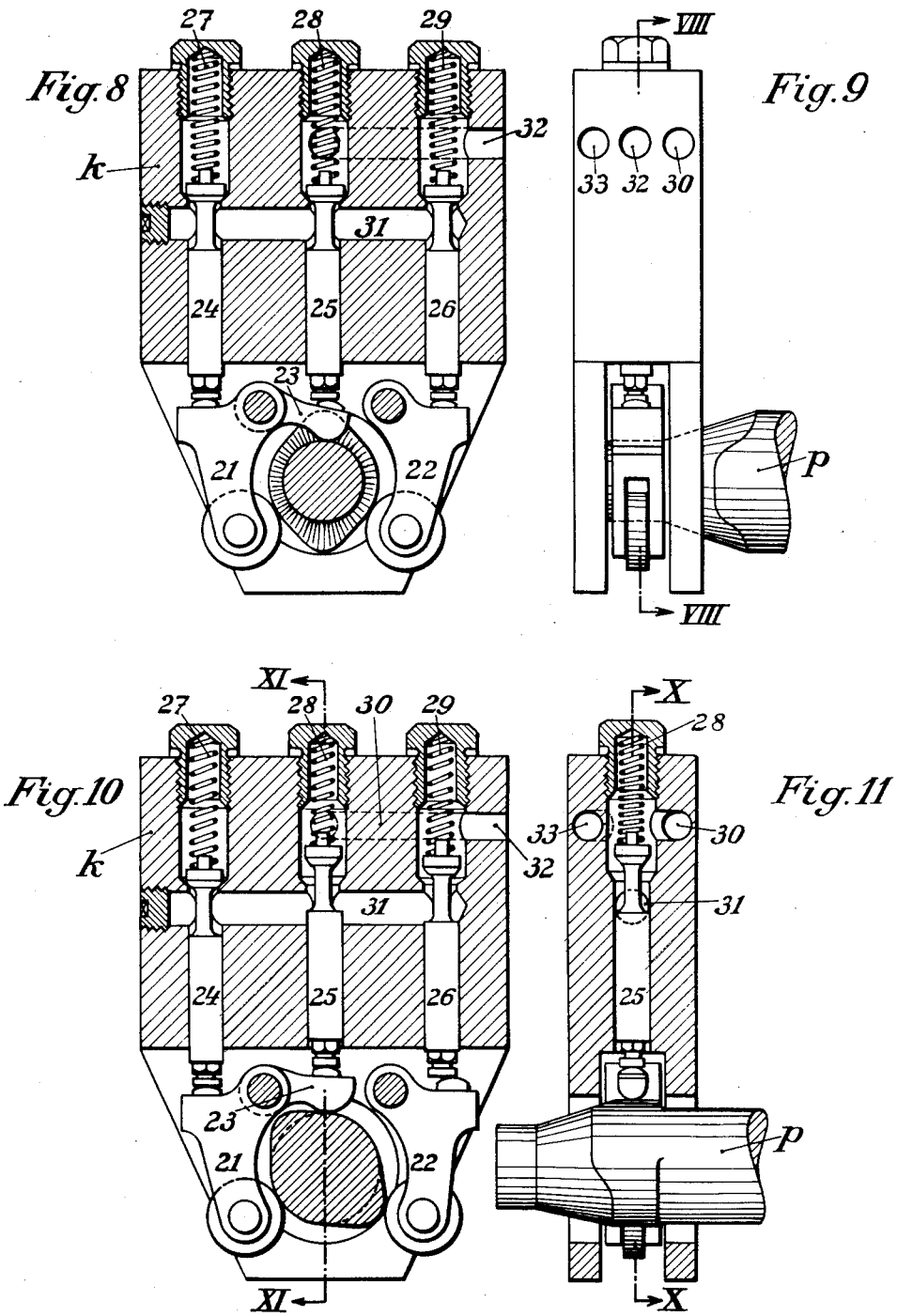

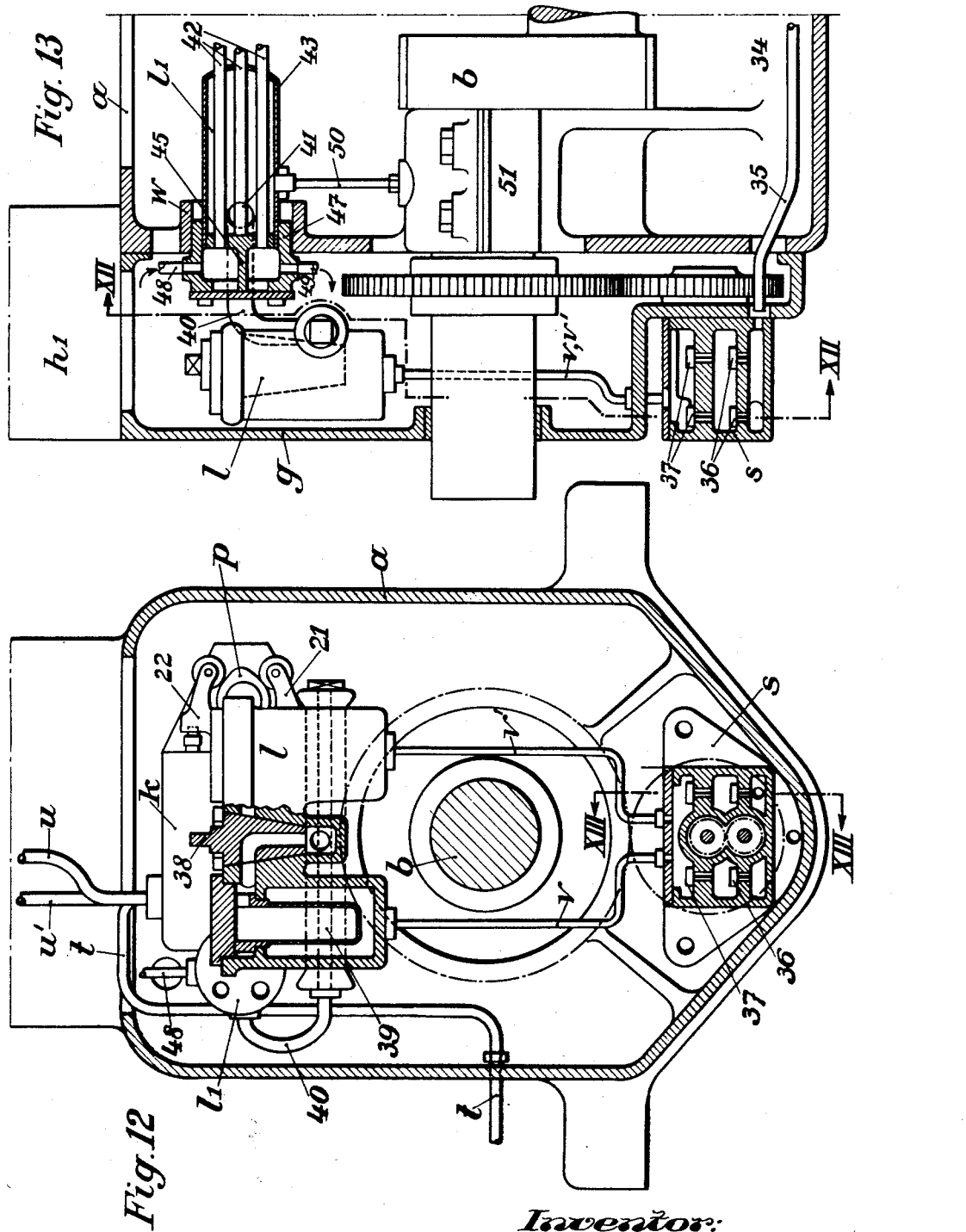

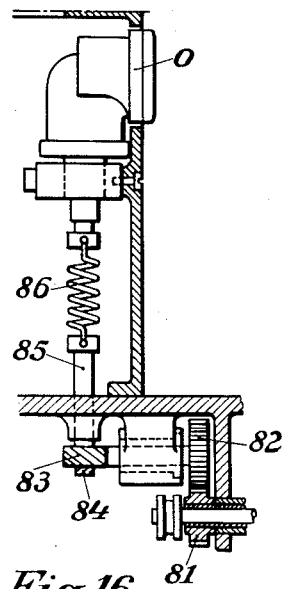
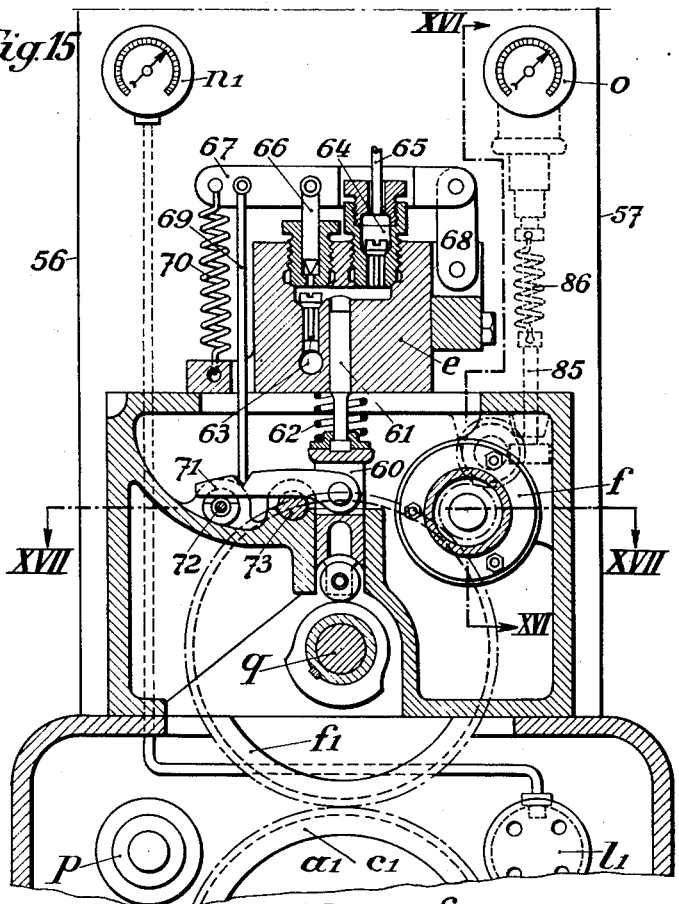
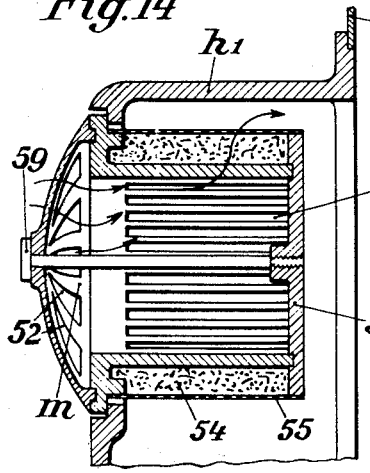
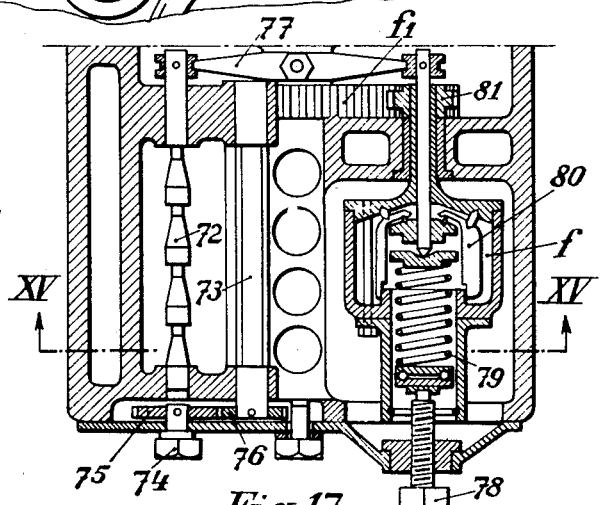
Fig.15
Fig.16
Fig.14
Fig.17
Inventor:
Carl Lindenberg

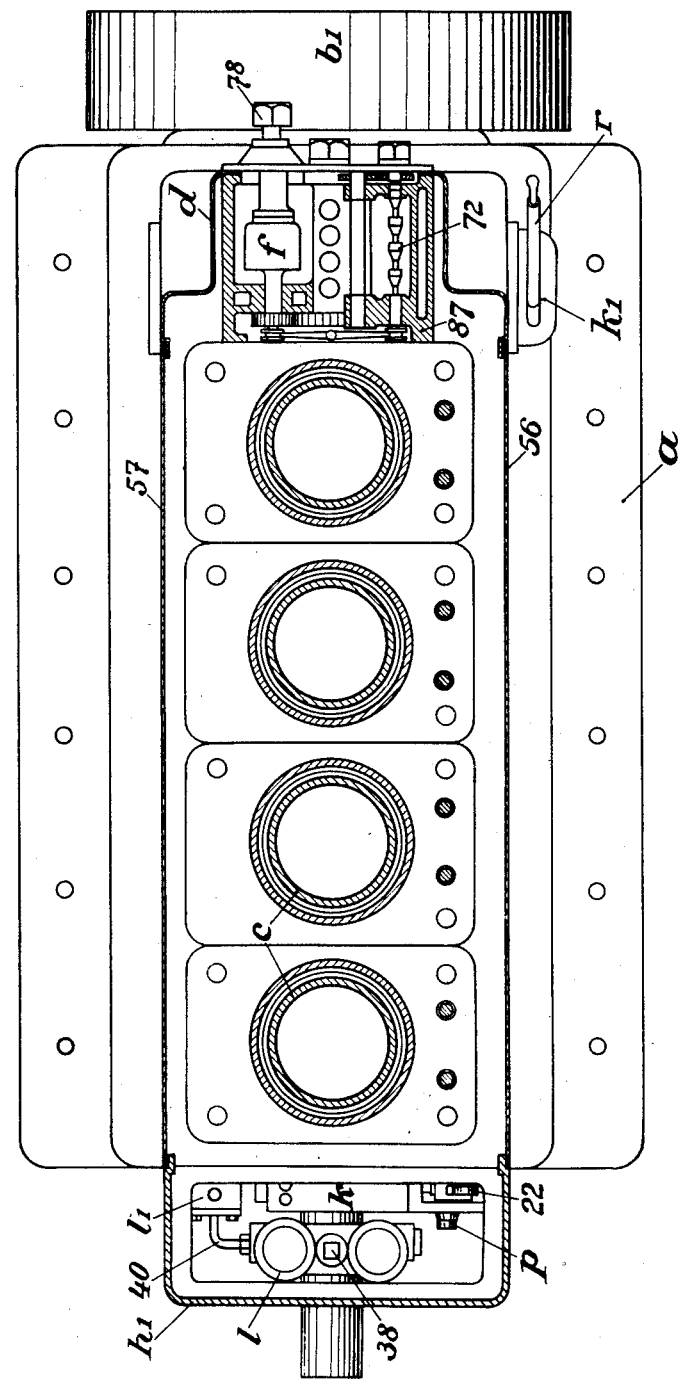

Patented Dec. 19, 1933

1,940,427

UNITED STATES PATENT OFFICE 1,940,427

VERTICAL MULTICYLINDER FOUR-STROKE CYCLE INTERNAL COMBUSTION ENGINE

Carl Lindenberg, Hoffnungsthal, near Cologne-on-the-Rhine, Germany, assignor to Motorenfabrik Deutz Aktiengesellschaft, Cologne-Deutz, Germany Application March 14, 1929, Serial No. 347,080, and in Germany March 17, 1928

5 Claims. (Cl. 123—195)

The present invention relates to a particular suitable construction of an engine type for multi-cylinder four stroke cycle internal combustion engines.

The invention has among its objects the interchangeability of engine parts so that they may be used for both right hand and left hand engines without alteration of the engine frame which supports these parts. Conveniently to this end all control apparatus is arranged at one side of the engine so that it is easily accessible, may be readily inspected, and may with facility be completely protected.

In order to allow a quick reversing of the engine without enlarging its length in comparison with the minimum length for non reversible engines, the cam shaft is of a particular shape to suit this purpose.

The problem conveniently may be solved by mounting on the crank case at each end of the engine a vertical platelike member, these members being connected by sheet iron or like plates at each longitudinal side of the engine, the enclosure for the cylinders thus formed being covered by a hood.

One of these plates contains the wheel-case with the intermediate drive for the governor shaft also the drive for the fuel pump arranged above the shaft besides the governor of said pump and if desired all the rest of the apparatus as there are tachometer, oil pressure indicator and the like, which have to be attended to and watched.

The side of the crank case opposite the wheel-box is closed by a casing containing the starting besides all the other auxiliary parts as oil filter, pipe connections for oil for the valve gear, lubricating oil and cooling water, whereby the side plate mounted above the starting gear may be constructed to receive the air filter.

The combination of the two sides plates and sheet iron plates connected therewith with the hood enclosing the cylinder-heads is a dust-proof closed hollow-space, which has been developed that way to form a suction chamber, which is utilized economically as a collector for the suction air.

Another advantage of the invention lies in the compactness of the arrangement of valve gear and pump driving mechanism and of all maneuvering and control apparatus and the pipe connections for the oil filter and the like, whereby easy accessibility has been attained, insuring convenient starting and operation of the engine as well as protecting the parts mentioned against damage so far as possible.

It is however known that multi-cylinder engines of the completely enclosed type have been built already. But this construction could only be accomplished up to present by casting the cylinders in form of a block either into one single block for all cylinders or several partial blocks for a number of groups of cylinders, which were screwed together; but the advantage of the manufacture of exchangeable single cylinders had to be relinquished that way or else high priced iron frames were used, into which the single cylinders were mounted and lined on the outside by sheet iron.

The present invention on the contrary allows the assemblage of a 2, 3, 4 and 6 cylinder engine out of single cylinders without any iron frame enclosing same, maintaining thereby the uniformity of all cylinders by constructing the whole as an outwardly closed block.

Another important improvement consists in the placing of important construction parts in such a way that by means of a simple exchanging of these parts a right hand engine may be altered without any change of the engine frame into a left hand one. Besides these features advantages in regard to the ways of the casting process are accomplished, which in general comprise the reduction of stresses and thereby the defects of such engine parts.

It is furthermore known, how to select the arrangement of a multi-cylinder engine in such a way that it is possible to annex the cam shaft either on the right or on the left side and to change by these means the right hand engine into a left hand one. This problem has previously been solved by constructing the engine in an absolutely symmetrical way in reference to a transverse plane laid through the centre of the engine so that one side is the reflection of the other one. But this arrangement fails when the drive of the cam shaft, as is the case in the present solution of the problem, is encased in an engine part cast directly with the engine frame into a single piece, in the same way as has been proved advantageous with small sized engines, which on account of economical reasons ought to be totally enclosed providing thereby as few annexed parts as possible. In this case the two sides of the engine appear to be different from each other in reference to a transverse plane laid through the engine centre and in consequence thereof the construction must be entirely different from the engine type already known, and ought to be characterized by an arrangement of symmetrical openings in side of the engine frame for the purpose of lodging therein the cam shaft on one or the other side.

Uniform openings have been arranged therefore in the engine frame on the same level with the holes necessary for the cam shaft and in a symmetrical way to the latter, allowing besides the housing of other construction parts, for instance the oil cooler or oil filter. That way the exchangeability of all the parts of the valve gear is warranted, without necessity to turn the engine around its vertical centre axis.

It is for the same purpose that the pair of wheels is arranged above the crank shaft, the latter driving said wheels and those again the cam shaft by a sideways engaging wheel whereas the fuel pumps are driven by a wheel engaging vertically above the shaft. By the symmetrical arrangement of the bearing places in the engine frame for the sideways engaging wheel in combination with the arrangement of the driving wheel for the fuel pump in the engine centre the change over of the cam shaft from the right hand engine to the left hand one may take place without altering the engine frame and with the use of the same gear wheels.

Attention may be called here to the particular form of this cam shaft in regard to reversible four stroke cycle Diesel engines starting in two stroke cycle, whereby the starting valves are brought to action the shifting of the cam shaft in the valve gear of the engine either to the right or to the left, providing thereby in a well known way oblique starting faces on the cams in order to save a lifting off and replacing of the rollers. These oblique starting faces as arranged with the previous constructions were accompanied by the drawback, that a very long shifting path was required resulting from the width and height of the cams, multiplied by the tangent of the allowed angle of starting: The long shifting path for the cam shaft is influencing the constructive length in an unfavourable manner and reduces its maneuverability.

The present invention does away with these drawbacks by making use of the fact that for the starting of the engine smaller openings of the exhaust valves are required, since in consequence of the incomplete number of revolutions of the engine only small quantities of air are passing through. It is for this purpose that the two cams for the exhaust valve arranged opposite each other are made of smaller size in accordance with the reduced valve stroke (for instance half of it) whereby a reduction of the gear stroke and a quicker maneuverability of the engine is accomplished.

One embodiment of the invention is illustrated in the accompanying drawings, in which:

Fig. 2 is an end elevation of the engine when viewed according to the arrow A in Fig. 1;

Fig. 3 is an end elevation of the engine when viewed according to the arrow B in Fig. 1;

Fig. 7 is an elevation of a modified form of cam shaft for use in a reversible engine;

Figs. 8 and 9 show the starting device of the engine constructed according to Fig. 1 in stop position, Fig. 9 being a plan of the starting device, and Fig. 8 a section on the line VIII—VIII of Fig. 9;

Figs. 10 and 11 show the starting device according to Figs. 8 and 9 in starting position, Fig. 10 being a section on the line X—X of Fig. 11, and Fig. 11 being a section on the line XI—XI of Fig. 10;

Figs. 12 and 13 show details of the lubricating system including the oil pump, oil filter, and oil cooler, Fig. 12 being a section on the line XII—XII of Fig. 13, and Fig. 13 being a section on the line XIII—XIII of Fig. 12;

Fig. 14 is a vertical section through the air filter;

Figs. 15 to 17 show the engine control mechanism including the fuel oil pump, governor, oil pressure indicator, and tachometer, Fig. 15 being a section on the line XV—XV of Fig. 17, and Figs. 16 and 17 respectively being sections on the lines XVI—XVI and XVII—XVII of Fig. 15;

Figure 1:
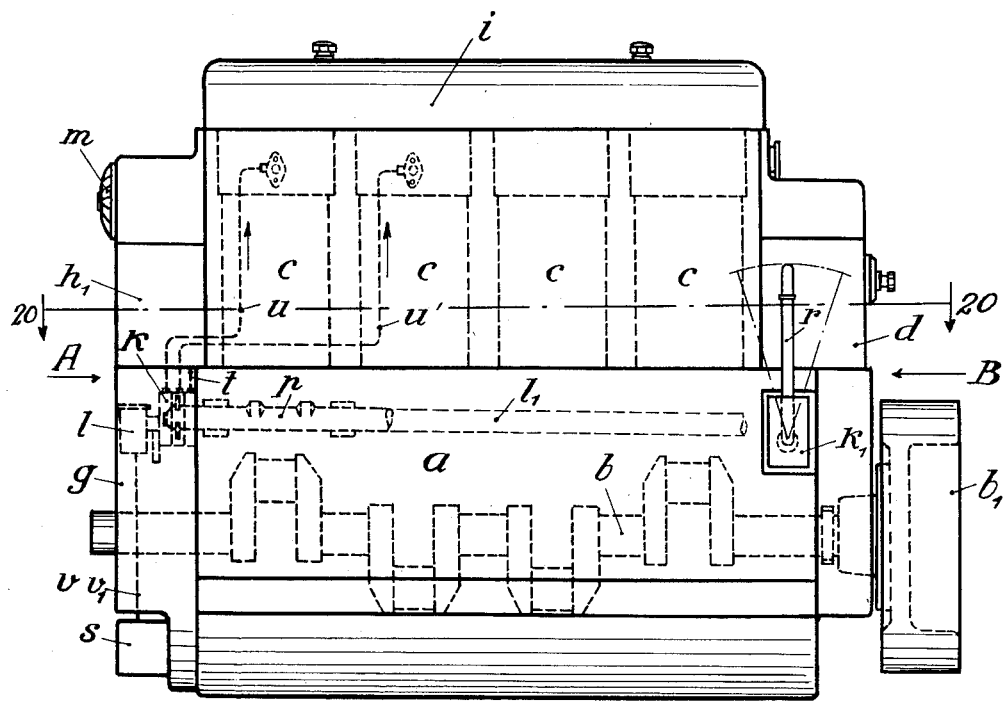
Fig. 1 is a side elevation of the engine.
Figure 6:
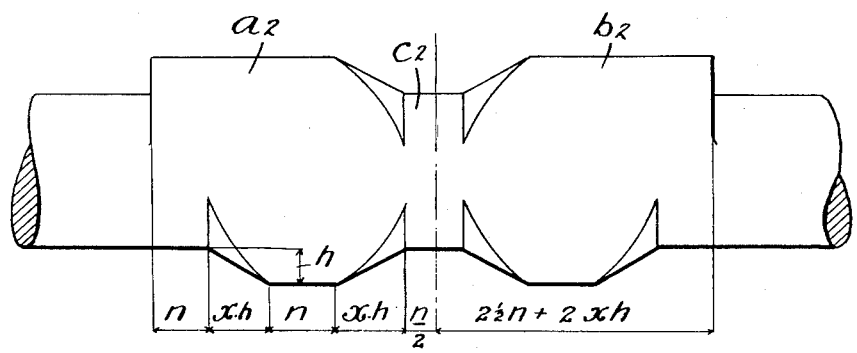
Fig. 6 is an elevation of the cam shaft used in a non-reversible engine constructed according to the preceding figures.
Figure 4:
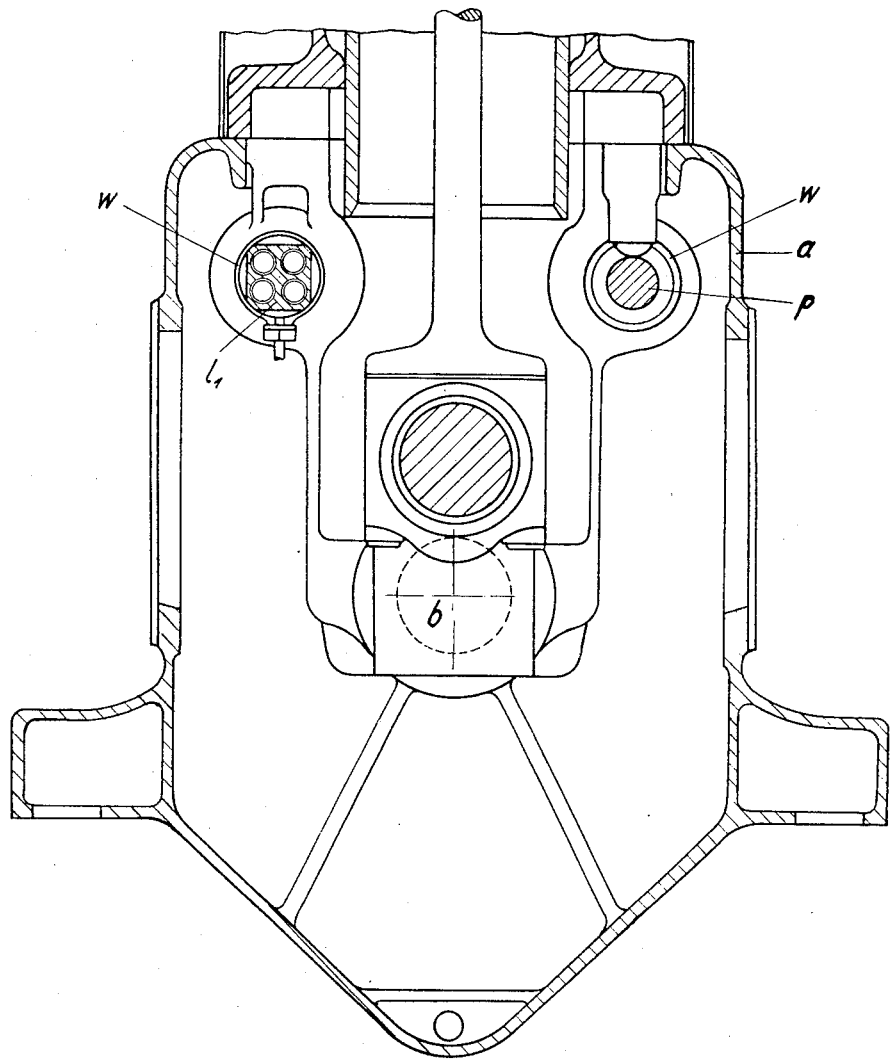
Fig. 4 is a vertical transverse section of the crank case in a plane including the axis of one of the engine cylinders.
Figure 18:
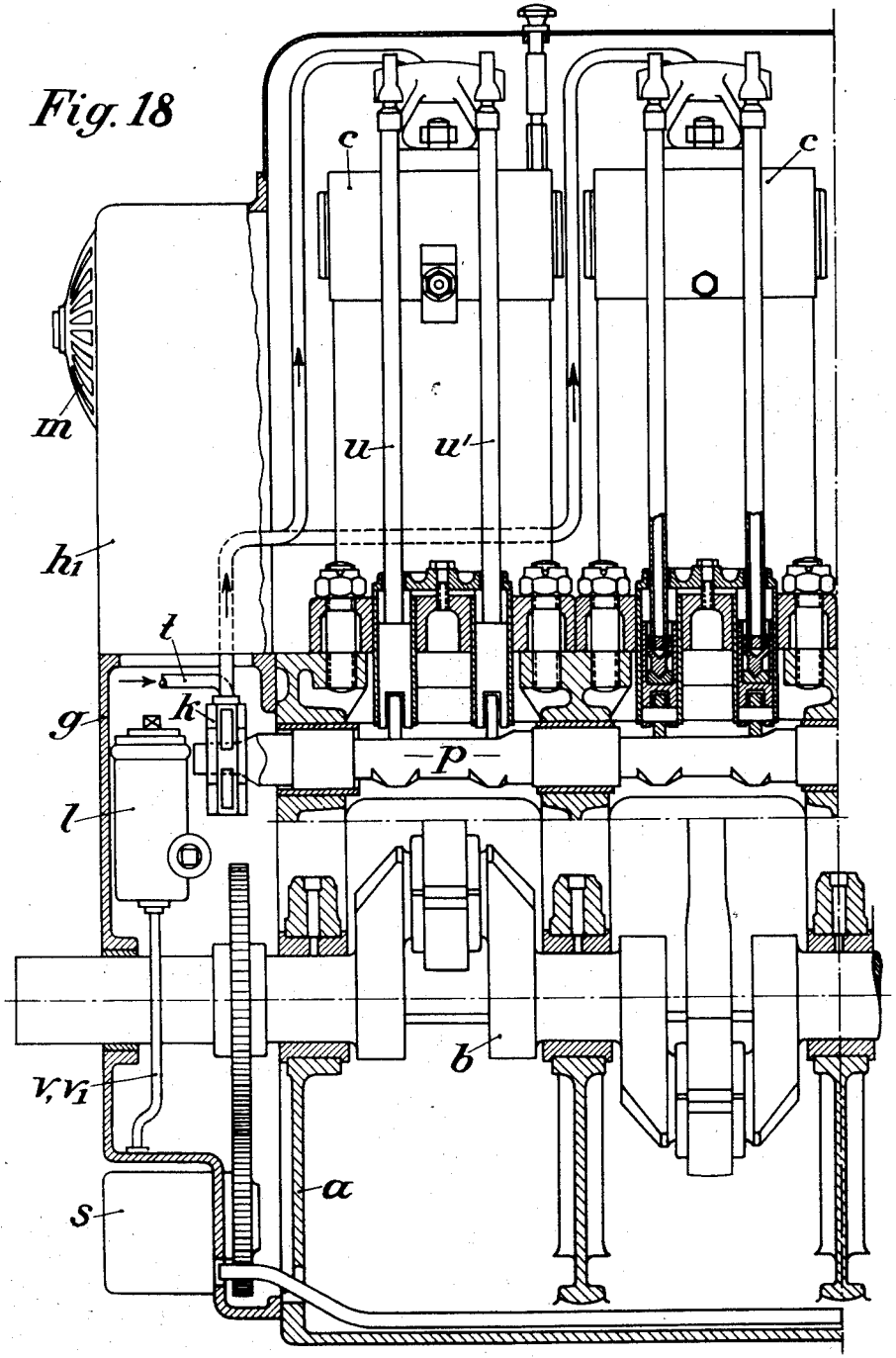
Figure 19:
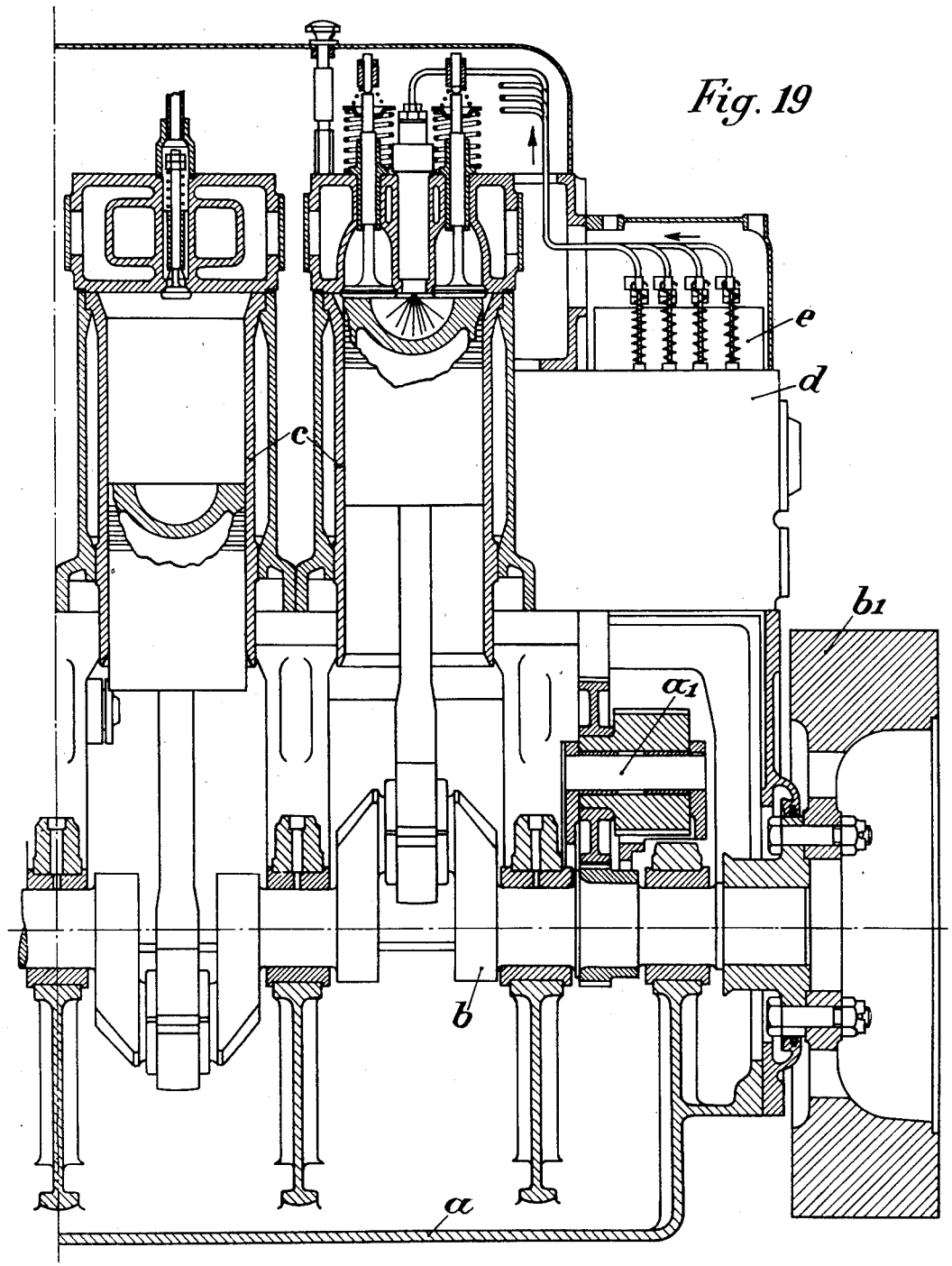

Figs. 18 and 19 collectively are a longitudinal section of the engine illustrated by Fig. 1, Fig. 18 showing the left hand end of the engine and Fig. 19 showing the right hand end thereof; and Fig. 20 is a section on the line 20—20 of Fig. 1.

Referring to the drawings, the engine comprises a crank case $a$ herein constituting the engine frame, in which crank case is journalled the engine crank shaft $b$ provided with a flywheel $b_1$ at the exterior of the crank case. Herein mounted on the crank case is a row of separate cylinders $c$, at one end of which row the crank case supports a transversely disposed vertical casing $d$ having an open side facing the row of cylinders. Conveniently, this casing is arranged to carry the fuel pump $e$, governor $f$, tachometer $o$, and oil pressure gauge $n_1$. At the opposite end of the engine from the casing $d$ the end of the crank case supports a casing $g$ for the starting gear $k$ and oil filter $l$, which casing at its lower portion also carries the oil pump $s$. Above the casing $g$, at that end of the row of cylinders opposite the casing $d$, is a further casing $h_1$ for the air filter $m$, this latter casing closing the top of the casing $g$. Cooperating with the casings $d$ and $h_1$ are vertical plates 56 and 57 (Fig. 15), preferably of sheet iron, respectively at opposite sides of the row of cylinders, so that these casings and plates completely laterally enclose the cylinders, while the hood $i$ forms a top cover for the enclosure thus formed.

Herein the fuel pump $e$ is operated by a cam shaft $q$, and the starting device $k$ by a cam shaft $p$, the starting device as shown being supplied with compressed air through a pipe $t$ and connected to the cylinders by pipes $u$ and $u_1$. In the present embodiment of the invention a hand lever $r$, which operates a crank arm $g_1$ (Fig. 3) is effective to shift the cam shaft $p$ for causing operation of the starting device when desired. As illustrated by Fig. 2, the pipes $v$ and $v_1$ lead from the oil pump $s$ to the oil filter $l$.

In the further development of said invention the engine frame $a$ has been equipped with a row of bosses having apertures $w$ equally placed and arranged one after the other, said aperture supporting on one side the cam shaft $p$, while those on the other side may serve for supporting the oil cooler $l_1$ $a_1$ and $c_1$ represents the intermediate double wheel driven by the crank shaft, $d_1$ the side plate for the intermediate wheel, $e_1$ the wheel of the cam shaft engaging from the side, and $f_1$ the driving wheel for the fuel pump $e$.

The change of the engine from right hand to left hand takes place in the following manner:

The cam shaft ($p$) and the oil cooler $l$ are exchanged, causing said shaft to be turned a definite angle in comparison to its previous position. Since the wheels ($c_1$) and ($e_1$) have been marked in such a way that it will be directly understood how to place the cam shaft for a right hand and a left hand engine, the fuel pump and governor work in the same manner for both kinds of engines, as nothing is changed in regard to the gearing or driving. To change from starting on air pressure to the normal run on fuel the cam shaft is shifted. For this purpose a grove has been provided in the cam shaft immediately behind the front wheel ($e_1$) to admit a forked lever $g_1$ operated through a handle $r$ from a box $k_1$.

Both sides of the engine frame have been provided with uniform openings, one of which is closed. When changing over the engine from a right hand engine to the left hand one it is only necessary to move the cap from one to the other and also the box from one side to the other; the driving of the air pressure valves taking place in the present case by means of cams at the end of the cam shaft; these cams are influencing some rollers journalled in a box arranged on the left front side of the engine. As said box is made symmetrical, it can be used for either position of the cam shaft when turning the latter, that is to say, for the rotation to the left as well as for the rotation to the right, and needs only to be turned itself getting the same set faces on the front side of the engine, as well in the right position as in the left position of the cam shaft.

For the reversible engine the cams are formed according to Figure 7:

$a_2$ designating the combined cams for the exhaust valve in a normal run and the starting of the engine ahead, $b_2$ the same cams in the backward move of the engine, $c_2$ the working faces for the exhaust valve roller in the position of the engine when at rest, $h$ the heights of the cams, $n$ the widths of the rollers.

In Figure 7: $d_2$ designates the cam for the exhaust valve of the engine in its normal move ahead, $e_2$, $e_3$ the cams for the exhaust valve of the engine in its move ahead when starting same, $f_2$ the cams for the exhaust valve of the engine in its normal backward move, $g_2$, $g_3$ the cams for the exhaust valve of the engine in its backward move when starting same, $c_3$ the working face for the exhaust valve roller in the position at rest, $h$ the height of cam for the exhaust in the starting position of the engine.

The several widths of the cams are shown in the drawing on the left side extending to the centre of the cam bundle, the widths of the starting faces being a function of the cam height that is: $x\,h$ for the full exhaust cam, $$x\frac{h}{2}$$

for the exhaust cam reduced to half its size. On the right side the summary is made of these several lengths for half the total length of the cams with the result, that the total length of the new form, wherein the height of the starting cams for instance is assumed to be equal to half the height of the previous form, has only two third of the total length of the previous form and that therefore only two third of the shifting path of the previous cam shaft is required, increasing that way the maneuverability of the engine as well in its head moving as in its backward run.

Referring to Figs. 8 to 11 inclusive, in the stop position of the starting device (Figs. 8 and 9) the three levers 21, 22 and 23 do not lift the air check valves 24, 25 and 26, said valves in this position remaining closed by the action of the springs 27, 28 and 29. However, in the starting position (Figs. 10 and 11) the cams on the cam shaft $p$ cause the valve 25 to be lifted continuously more or less from its seat, while the check valves 24 and 25 are lifted and closed in accordance with the shape of the cams. This will cause the inrushing air from the pipe $t$ (Fig. 2), which pipe is connected to the channel 30 (Figs. 9, 10 and 11), to flow through said channel to the valve 25 and from the latter to the channel 31, exit of air from which latter is controlled by the valves 24 and 26 respectively, causing air to be alternately admitted to the channels 32 and 33. The pipes $u$ and $u_1$ (Fig. 2) leading to the engine cylinders are respectively connected to the channels 33 and 32.

As shown by Figs. 12 and 13, the lubricating oil is drawn from the oil sump 34 through a suction pipe 35 and suction valves 36 into the oil pump $s$, and from the latter is forced through the check valves 47 and pipes $v$ and $v_1$ into the oil filters $l$. Depending upon the position of the cock 38 the oil passes through one of these filters (in the position of the cock shown by Fig. 12 through the left hand filter) and is discharged into the oil cooler $l$ at 41 by way of the channel 39 and pipe 40. From the oil cooler the oil is distributed to the different bearings, as for example, through the pipe 50 to the main bearing 51.

Figure 5:
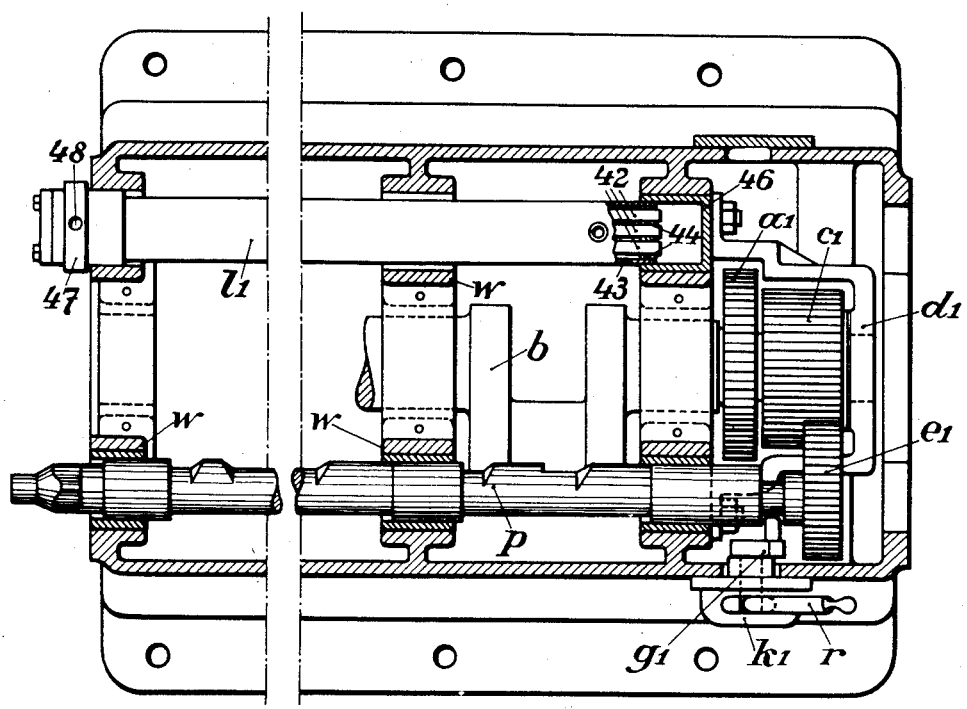
Fig. 5 is a section of the crank case of the engine according to Fig. 1 in a horizontal plane passing through the axis of the cam shaft.

As shown by Figs. 5 and 13, the cooling water tubes 42 of the oil cooler $l_1$ are surrounded by the pipe 43 which contains the oil and are supported in spaced relation to each other by tube plates 44 and 45, the ends of the pipe 43 being closed by headers 46 and 47. The cooling water enters the upper compartment of the header 47 through the pipe 48 and flows through the upper half of the water tubes 42 to the header 46, whence the water flows to the lower compartment of the header 47 through the lower half of the water tubes 42 and is discharged through the pipe 49.

Fig. 14 illustrates a detail of the air filter hereinbefore referred to. Exterior atmospheric air is sucked by the working cylinders through the slots 52 and 53, felt layer 54, and screen 55 into the chamber formed by the casing $h_1$, plate $d$, plates 56 and 57 covering the sides of the working cylinder, and the hood $i$. As shown, the screen 55 and felt layer 54 are held in place by a disk 58 and bolt 59.

As shown by Fig. 15, the fuel pump, the casing 87 for the operating mechanism of which is shown in Fig. 20, comprises a pump plunger 61 and automatic suction valves 63 and 64. The cam of the shaft $q$ for operating the fuel pump lifts the guide piece 60 and pump plunger 61 against the pressure of the spring 62, so that fuel will be discharged in timed relation to the engine speed through a pipe 65 leading to the engine cylinders. As shown, the fuel pump is provided with a by-pass valve 66 actuated by a lever 67. Herein a rod 69 operatively connects the lever 67 with a lever 71, the parts being held in operative relation to each other by the link 68 attached to one end of the lever 67 and the tension spring 70 attached to the opposite end of said lever. As shown, the lever 61 rests upon cam shafts 72 and 73, operation of which tends to open or close the by-pass valve 66. Herein the shaft 72 is controlled by the engine governor and the shaft 73 is operated manually for stopping the engine.

When the engine is to be stopped, the handle 74 (Fig. 17) is rotated through about 180°, turning the gear wheels 75 and 76, which rotates the shaft 73 for lifting the lever 71 and opening the by-pass valve 66. As illustrated by Fig. 17, a governor $f$ is provided for actuating the cam shaft 72, which latter is connected to a lever 77 operated by the governor, the latter being provided with the governor weights 80, governor spring 79, and governor spring tensioning means 78. The tachometer $o$ for indicating the engine speed is driven by the governor drive gear 81 through the gears 82, 83 and 84, the latter being mounted on a vertical shaft 85 connected to the tachometer drive shaft through a driving spring 86.

What I claim as new and desire to secure by Letters Patent is:

1. A vertical multi-cylinder internal combustion engine having, in combination, a crank case, a crank shaft supported in said crank case, the latter having interiorly thereof at opposite sides in symmetrical relation with said crank shaft separate means each for rotatably supporting a transferable cam shaft.

2. A vertical multi-cylinder internal combustion engine having, in combination, a crank case, a crank shaft supported in said crank case, the latter having interiorly thereof at opposite sides in symmetrical relation with said crank shaft separate means each for rotatably supporting a transferable cam shaft, and gearing for said cam shaft permitting said cam shaft to be driven by said crank shaft when placed on said supporting means at either side of said crank case.

3. A vertical multi-cylinder internal combustion engine having, in combination, a crank case, a crank shaft supported in said crank case, the latter having interiorly thereof at opposite sides in symmetrical relation with said crank shaft separate means each for rotatably supporting a transferable cam shaft, a fuel pump supported by said crank case, and operating means for said pump comprising a gear wheel the axis of which is in the same vertical plane as said crank shaft, and a gear wheel on said crank shaft for driving said first mentioned gear wheel.

4. A vertical multi-cylinder internal combustion engine having, in combination, a crank case, a crank shaft supported in said crank case, the latter having interiorly thereof at opposite sides in symmetrical relation with said crank shaft separate means each for rotatably supporting a transferable cam shaft, a gear wheel on said cam shaft, a fuel pump supported by said crank case, operating means for said pump comprising a gear wheel the axis of which is in the same vertical plane as said crank shaft, and gear wheel means coaxial with said crank shaft for driving said gear wheel on said cam shaft and said pump operating gear wheel.

5. A vertical multi-cylinder internal combustion engine having, in combination, a crank case, a crank shaft supported in said crank case, the latter having interiorly thereof at opposite sides in symmetrical relation with said crank shaft separate means each for rotatably supporting a transferable cam shaft, said cam shaft having cams for each engine cylinder for controlling the engine during normal running and two exhaust cams for each cylinder, said cams being connected by oblique faces.

CARL LINDENBERG.

Certificate of Correction

Patent No. 1,940,427.

December 19, 1933.

CARL LINDENBERG

It is hereby certified that error appears in the printed specification of the above-numbered patent requiring correction as follows: Page 2, line 146, for "$l_1$," read $l_1$.: and that the said Letters Patent should be read with this correction therein that the same may conform to the record of the case in the Patent Office.

Signed and sealed this 23d day of January, A. D. 1934.

[SEAL]

F. M. HOPKINS,
*Acting Commissioner of Patents.*